April 25, 1933. W. D. ARCHEA 1,905,673
MILLING MACHINE
Filed Jan. 8, 1930 2 Sheets-Sheet 1

Inventor
WALTER D. ARCHEA
By AH Parsons
Attorney

April 25, 1933.  W. D. ARCHEA  1,905,673
MILLING MACHINE
Filed Jan. 8, 1930   2 Sheets-Sheet 2
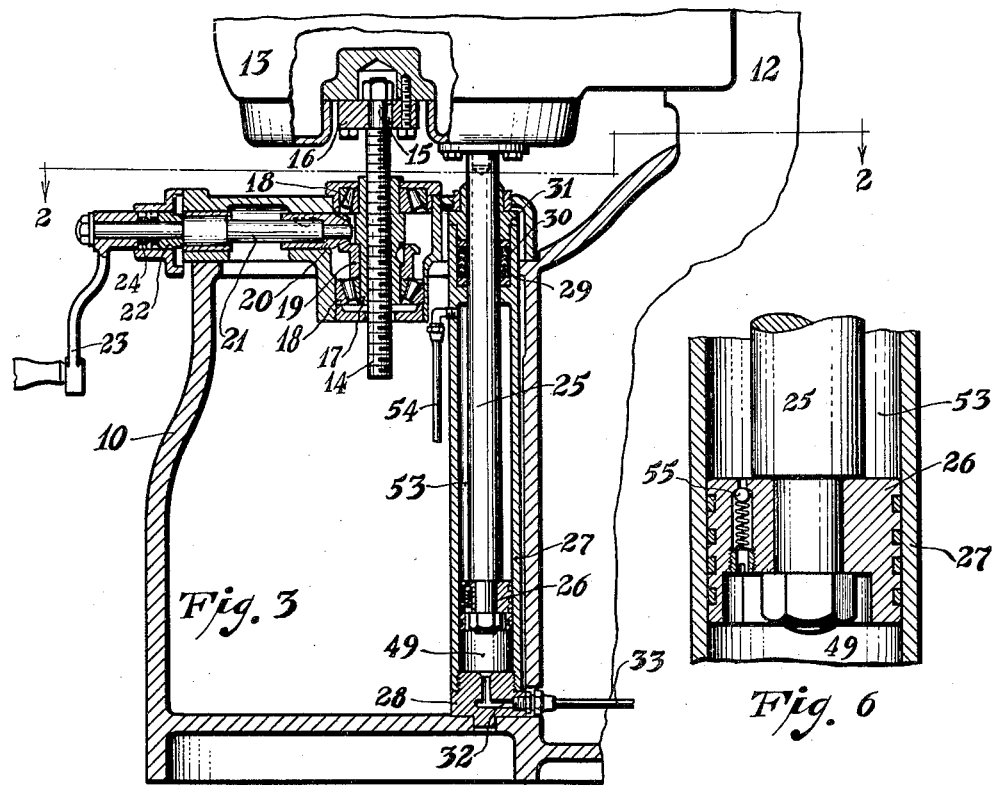
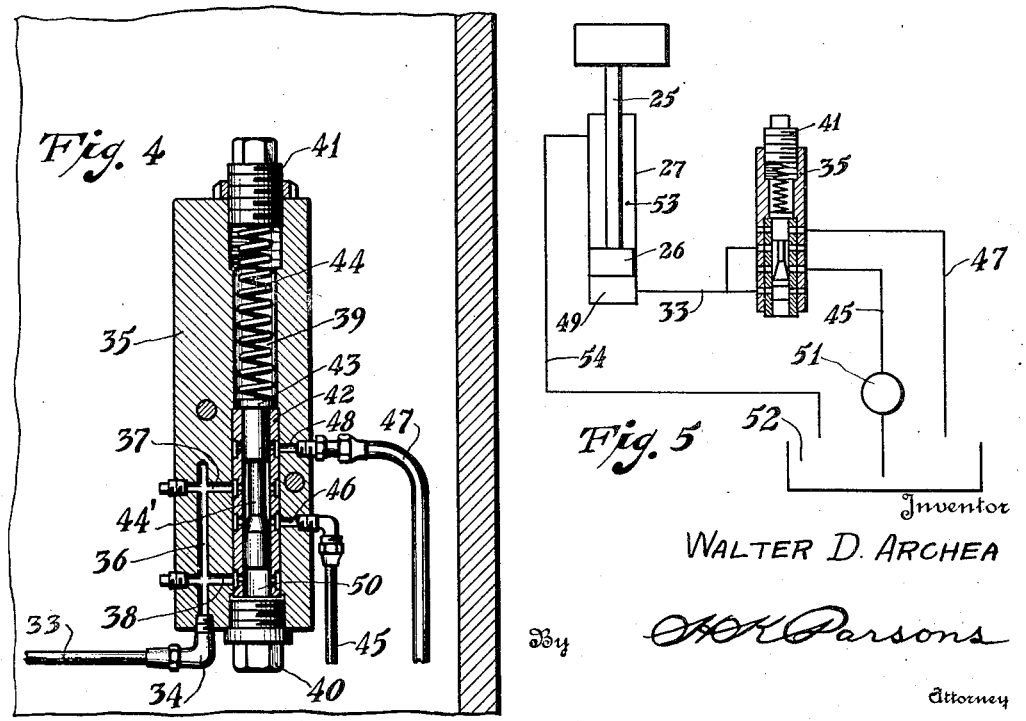
Inventor
WALTER D. ARCHEA Patented Apr. 25, 1933

1,905,673

UNITED STATES PATENT OFFICE

WALTER D. ARCHEA, OF CINCINNATI, OHIO, ASSIGNOR TO THE CINCINNATI MILLING MACHINE COMPANY, OF CINCINNATI, OHIO, A CORPORATION OF OHIO

MILLING MACHINE

Application filed January 8, 1930. Serial No. 419,425.

This invention relates to milling machines and more particularly to machines having an adjustable cutter spindle head. In some types of milling machines, such as the solid bed type wherein the work table is directly mounted on the bed, the cutter spindle is slidably mounted on a column adjacent to the bed for adjusting purposes, to adapt the machine to handle various sizes of work pieces. In such machines the cutter spindle is journaled in a head which has guides for mounting on the column guideway. Such spindle heads are heavy and cumbersome for one man to adjust and it is one of the objects of this invention to facilitate the adjustment of such spindle heads by providing a novel means to counterbalance their weight.

Another object of this invention is to provide a hydraulic counterbalance for use on hydraulically actuated machine tools, that is adapted to make use of the hydraulic pressure already existing in the machine.

Other objects and advantages of the present invention should be readily apparent by reference to the following specification, considered in conjunction with the accompanying drawings illustrative of one embodiment thereof, but it will be understood that any modifications may be made in the specific structural details hereinafter disclosed, within the scope of the appended claims, without departing from or exceeding the spirit of the invention.

Referring to the drawings, in which like reference numerals indicate like parts:

Figure 3 is a vertical section on the line 3—3 of Figure 2;

Figure 4 is a detail view of the reducing valve;

Figure 5 is a diagrammatic view of the hydraulic circuit; and

Figure 6 is a detail view of the piston, showing the relief valve.

Figure 1:
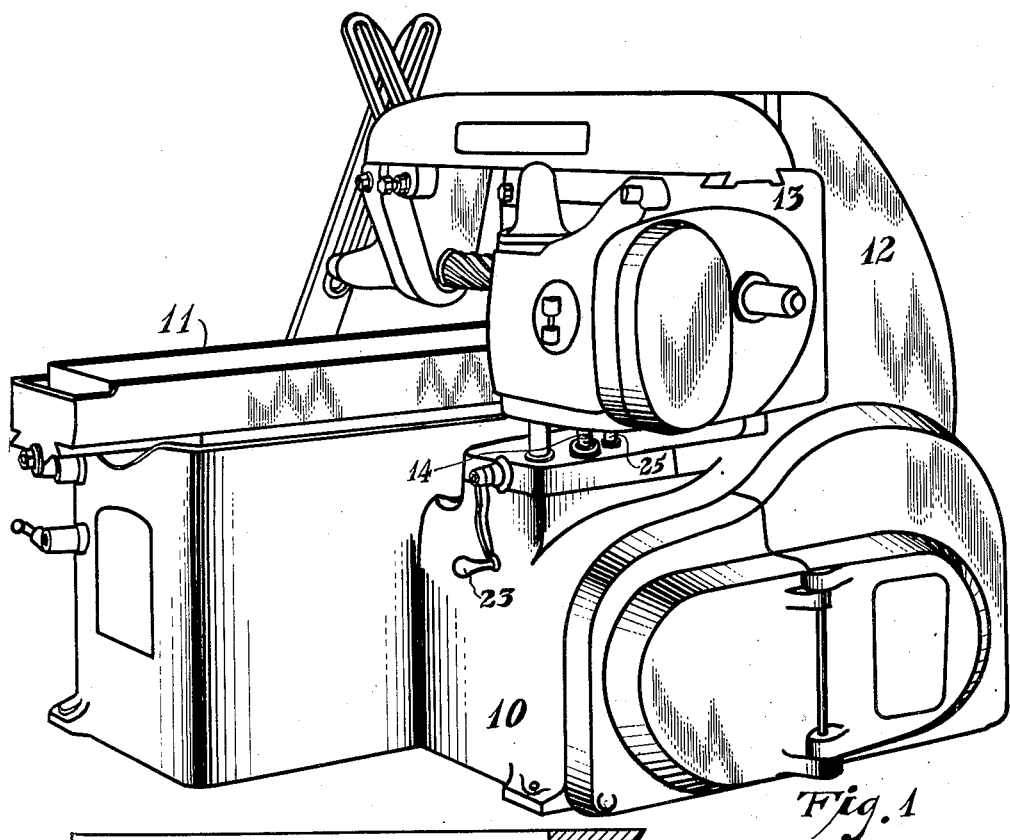
Figure 1 is a perspective view of the machine, showing one embodiment of the invention.
Figure 2:
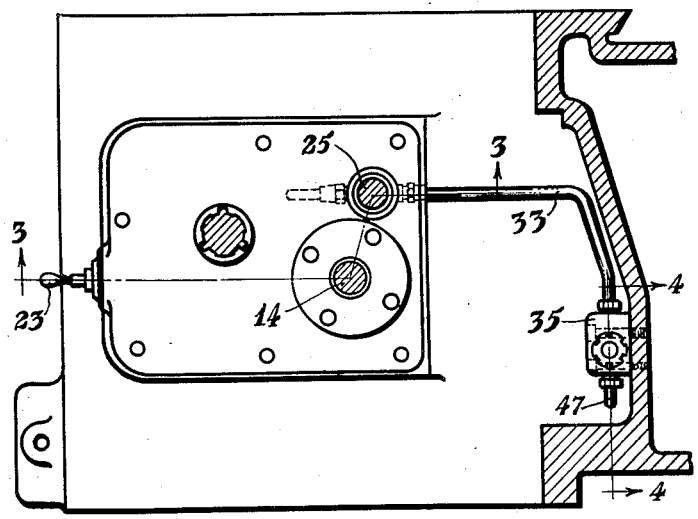
Figure 2 is a plan view on the line 2—2 of Figure 3.

Referring to the drawings, reference numeral 10 represents the base of the machine having slidably mounted thereon the work table 11 and having integral therewith the column 12 upon which is mounted, for vertical adjustment, the spindle head 13. Referring to Figure 3, the spindle head 13 has depending from its under side the feed screw 14, which is held against rotation by the key 15 mounted in the yoke 16 secured to the under side of the head. The feed nut 17, which is mounted in anti-friction bearings 18 in base 10 of the machine, is internally threaded to receive the feed screw 14. The bevel gear 19 is keyed to the feed nut and interengages the bevel gear 20 keyed to the end of shaft 21 journaled in the base of the machine and having mounted on its outer end the clutch member 22. The handle 23, which is loose on the end of shaft 21, has clutch teeth 24 for inter-engagement with the clutch 22, for rotating the shaft 21 and thereby, through the feed nut, to raise or lower the spindle head 13.

There is also secured to the under side of the spindle head 13, the piston rod 25 having mounted upon its lower end the piston 26 slidably mounted in the cylinder 27 which is threaded onto the cylinder head 28 mounted in the base of the machine. The other end of the cylinder has the recess 29, in which is placed the packing 30 surrounding the piston rod and held therein by the plug 31. Cylinder head 28 has a bore 32, through which hydraulic pressure is admitted to the cylinder. The pipe 33 has one end threaded in the bore 32 and an elbow 34 on its other end for connection to the reducing valve body 35. The pipe 33 connects with a vertical channel 36 in the valve body, which has two horizontal branches 37 and 38. The central bore 39 is provided in the valve body and is closed at one end by the threaded plug 40 and at the other end by the adjusting screw 41. The sleeve 42 is tightly fitted into the lower portion of the bore 39 and surrounds the vertically movable valve member 43, and a spring 44 is inserted in the upper portion of the bore between the valve and the adjusting screw 41. By adjusting the screw 41, any compression desired may be set up in the spring to thereby load the valve 43 and determine the pressure at which it will lift. An inlet pipe 45 connects with the channel 46 and an outlet pipe 47 is connected with the channel 48 in the valve body. Valve 43 has the reduced portion 44' which, in the position shown in Figure 4, allows fluid from the inlet pipe 45 to flow from the channel 46 into channel 37 and then to the cylinder 27. However, if the pressure in the chamber 49 of the cylinder 27 increases beyond a predetermined point, it will be transmitted by means of the channel 38 to the chamber 50 under the valve 43, thereby lifting the valve against the spring pressure and shutting off the inlet flow through channel 46 and by continued movement will unport the channel 48, allowing the pressure to relieve itself through the channel 37, channel 48 and return pipe 47.

A pump 51 may be used to supply pressure to the inlet pipe 45 and this pump may be a separate pump supplied for this purpose or it may be the pump which supplies hydraulic pressure for the operation of the machine tool. In either case, it would be supplied with oil from a reservoir such as 52, and the drain pipe 47 would be connected with the same reservoir.

The upper chamber 53 in the cylinder 27 is connected by means of the pipe 54 attached to the upper end of the chamber with the reservoir 52, so that in case of leakage of oil past the piston 26 it may be returned to the reservoir. A relief valve 55, in the form of a spring pressed ball, is provided in the piston 26 so that if, for any reason, the drain pipe 54 should become blocked and any abnormal pressure created in the chamber 53, it may escape through relief valve and thus prevent any damage to the machine.

In the operation of this device, if it is desired to raise the head 13, the handle 23 is engaged with the clutch 22 to rotate the shaft 21 and thereby the feed nut, and, by means of the continued pressure in the chamber 49 aiding in the lifting, the head 13 may be moved upward with ease. It will be understood that the chamber 49 will have fluid therein at a given constant pressure, depending upon the setting of the spring 44, irrespective of the movement of the piston 26 up or down. This pressure is automatically controlled and maintained by the valve 43. When it is desired to lower the table, the increased pressure in the chamber 49, caused by rotating the feed nut, will cause the valve 43 to lift and thereby allow the excess pressure to flow through the return pipe 47 back to the reservoir.

What is claimed is:

1. In a milling machine having a bed, a table slidably mounted on the bed, a column, and a spindle carrier mounted on the column for adjusting movement thereon toward and from the table, the combination of means to effect the adjustment comprising a depending screw fixed to the carrier, a nut rotatably journaled in the bed, manual means for effecting rotation of the nut, means for counterbalancing the carrier during said rotation comprising a piston and cylinder, means to connect the piston with the carrier, a control valve having a pressure and an exhaust port, a source of pressure therefor, an additional pair of ports formed in the valve, a single channel connecting said pair of ports with the cylinder, and means in the valve effective upon rotation of said nut to maintain a constant pressure in the cylinder by alternate connections of said channel with the pressure and exhaust ports.

2. In a milling machine having a bed, a table slidably mounted on said bed, a column, a spindle carrier mounted on said column for movement toward and from said table, the combination of means for effecting said movement including a screw and nut, and means to counter-balance the carrier during movement in either direction including a piston and cylinder, one of which is attached to said head, a source of hydraulic pressure coupled to said cylinder to effect a lifting force on said head and adjustable automatic valve means for maintaining the pressure at a predetermined constant value during movement of the head in either direction.

3. In a machine tool having a vertically adjustable member, mechanically actuated means for effecting said adjustment, the combination of means for counterbalancing said member during adjusting movement in either direction including a counterbalancing chamber, a source of hydraulic pressure connected thereto, a reservoir, an exhaust channel leading to said reservoir, and means responsive to a rise in pressure in said chamber beyond a predetermined amount to disconnect the source of pressure and connect the chamber with the exhaust channel and thereby to the reservoir.

4. In a machine tool having a vertically adjustable spindle head and mechanically actuated means for effecting said adjustment, the combination of means for counterbalancing said head including a piston and cylinder, one of which is attached to said head, a pump for creating a source of pressure, channel means connecting said cylinder with said source, an exhaust channel, valve means interposed between the cylinder and said channels, said valve being operable when the pressure in said cylinder exceeds a predetermined amount to disconnect the source of pressure from the cylinder and connect the cylinder with the exhaust channel.

5. In a machine tool having a vertically adjustable member and mechanically actuated means for effecting said adjustment, the combination of means for counterbalancing said member including a piston and cylinder, one of which is attached to said member, a fluid reservoir, a channel connected to the cylinder, a pump for withdrawing fluid from the reservoir and delivering it to said channel under pressure, a valve in said channel, an exhaust channel leading to the reservoir, resilient means normally positioning said valve to maintain connection between the cylinder and pump, and pressure responsive means for shifting said valve when the pressure in the cylinder exceeds a predetermined amount and thereby disconnect the cylinder from the pump and connect the cylinder with the exhaust channel and thereby to the reservoir.

6. In a machine tool having a table and a spindle head mounted for vertical movement toward and from the table, the combination with means to effect said vertical movement of auxiliary hydraulic means to maintain a constant lifting pressure on said head during movement in either direction comprising a pair of pressure separable units, a pressure channel and an exhaust channel, a valve adapted to connect the pressure channel to said units and maintain the pressure at a predetermined constant, and means to shift the valve when said pressure exceeds a predetermined amount to disconnect the pressure channel and connect the units to said exhaust channel whereby the lifting pressure will be substantially the same during movement of the head in both directions.

7. In a milling machine having a bed, a table slidably mounted on said bed, a column, a cutter spindle mounted on the column for adjustment toward and from said table, the combination with means to effect said adjustment including a screw and nut of counterbalancing means comprising a piston and cylinder extending in parallel relation to said screw, means to connect the piston to said head, a control valve, a pressure channel and exhaust channel connected to said valve, a fluid reservoir, a pump for withdrawing fluid from the reservoir and delivering it to the pressure channel, means to connect the control valve with the cylinder, resilient means normally operable on said valve to maintain said pressure channel in communication with the cylinder, and means to shift the valve against the pressure of said resilient means to disconnect the pressure channel and connect the exhaust channel with said cylinder when the pressure in the cylinder exceeds a predetermined maximum whereby a counterbalancing force of constant value will be continuously exerted on said head during movement in either direction thereof.

In testimony whereof I affix my signature.

WALTER D. ARCHEA.